Dec. 27, 1955    J. H. NEHER    2,728,524
TIMING AND TESTING CIRCUIT
Filed July 10, 1951
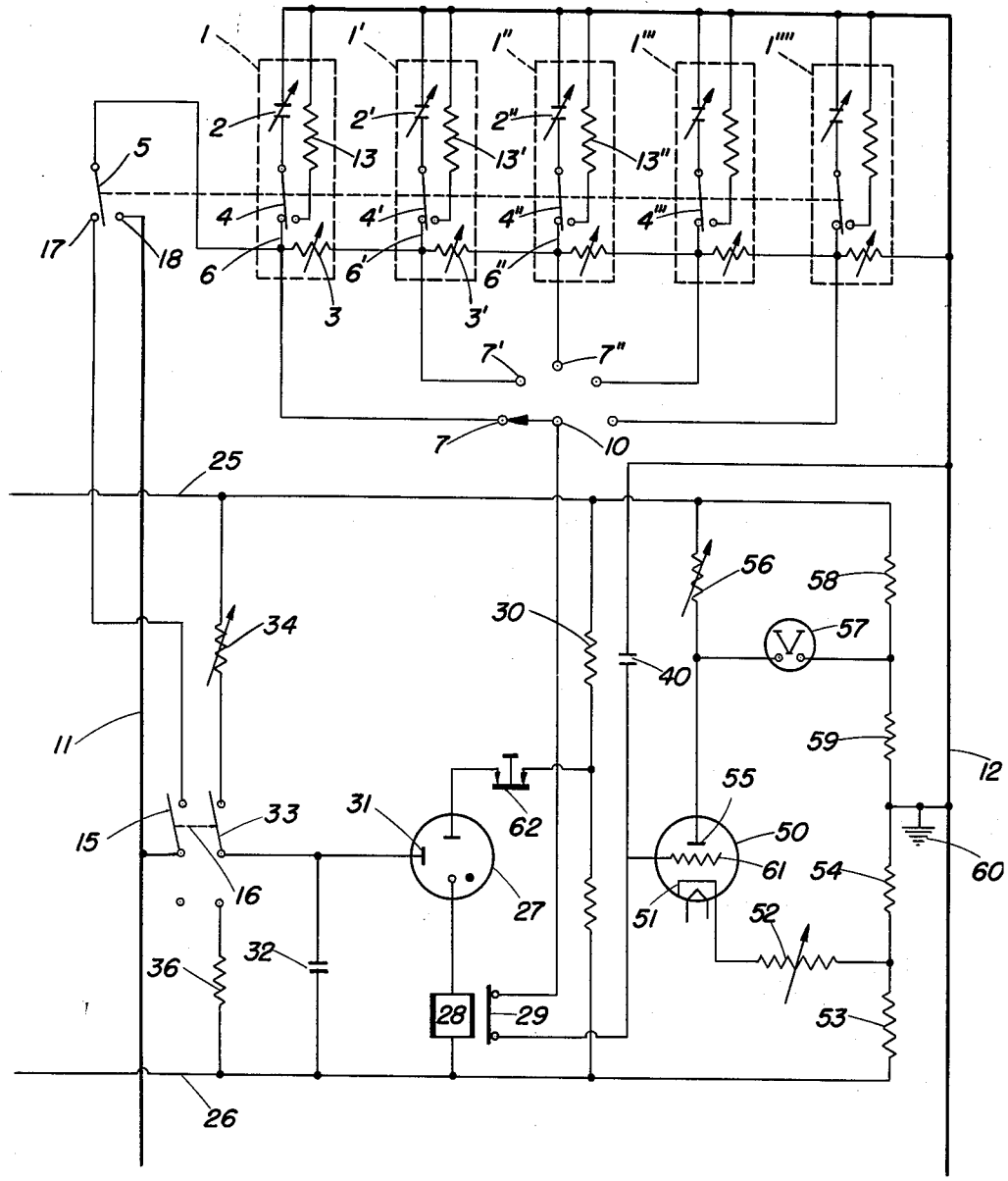
INVENTOR.
JOHN H. NEHER
BY
ATTORNEY

United States Patent Office 2,728,524
Patented Dec. 27, 1955

2,728,524

TIMING AND TESTING CIRCUIT

John H. Neher, Wynnewood, Pa.

Application July 10, 1951, Serial No. 236,026

3 Claims. (Cl. 235—61)

This invention relates to a new and useful electrical control circuit and is especially directed to an automatically timed comparative testing circuit primarily intended for combination and interconnection with means, including elements possessing certain properties analogous to corresponding properties of the several elements of an electric power transmission system or the like, whereby conditions, analogous and therefore comparable to those encountered in actual service by the elements of the system, may be imposed upon the first mentioned elements and with the aid of the testing circuit information may be obtained as to the effects of service conditions upon the elements of the system.

It has been found feasible in determining the thermal effect of the passage of electric currents through power transmission cables and other conductors of various kinds to establish an analogous electrical circuit consisting of a combination of capacitances and resistances adapted for adjustment so as to yield under suitably controlled conditions data expressed in electrical units and convertible by analogy to the data expressed in units of heat or temperature which would be yielded by actual temperature measurements in the cable or other conductor when subjected to known and analogous conditions. Thus on passage of a suitable electric current through the circuit for an appropriate predetermined period of time charges accumulate in the capacitances which can be measured and the expressions of their magnitude with the aid of certain mathematical computations converted to expressions of temperature.

Apparatus heretofore suggested for properly controlling such circuits and measuring the charges accumulating in the capacitances suitably for analog computation work has incorporated capacitors of extremely large size and expensive nature, requiring a large laboratory or similar accommodation for its housing and appropriate utilization. Consequently it has been impractical for operators of relatively small systems to provide such apparatus for thermal studies of their transmission facilities or to solve all thermal problems arising therefrom.

It is therefore a principal object of the invention to provide a relatively simple timing and comparative testing circuit adapted for cooperation and combination with an analog circuit designed to produce electrical charges in certain of its several components analogous in terms of electrical units to heat effects produced in the parts of a power transmission system or the like through imposition on the system of a load of predetermined magnitude for a predetermined period of time.

Other objects, purposes and advantages of the invention will be understood or will more fully appear from the following description of one embodiment of it, reference being had to the accompanying drawing in the single diagrammatic figure of which the circuits employed are schematically shown in operative combination and association with those of certain electrical elements analogous and corresponding to the several parts of an electric power transmission system or the like, the characteristics of which are to be studied.

As has been indicated the study of said effects over a period of time on transmission systems has been only partially explored and for laboratory testing and compilation of useful data it has heretofore been necessary to use such elaborate apparatus that it has seldom, if ever, been possible for moderate sized and local power companies to make fully detailed and exhaustive studies of the potentialities under actual service conditions of the lines which make up their power receiving and distributing systems.

The solution of thermal problems, for example in connection with a power transmission line, by observation and interpretation of data derived from electrical instruments in accordance with the invention depends upon the close resemblance between thermal and electrical phenomena which enables electrical data derived from the latter to be translated by analogies to thermal data which would be obtained from actual temperature measurements of the respective parts of the system to which the quantities measured by the electrical instruments of the testing apparatus are made analogous.

Thus through the medium of my invention it is possible to obtain readings from portable apparatus which may be set up so as to simulate a variety of conditions and enable the solution of cable and transformer load heating problems to be effected through the use of electrical counterparts of the various elements of the system; moreover the apparatus can be kept relatively small in size and made so as to involve the use of but small electrical quantities whereby the effects produced in a relatively short time and in the same relative proportion, although of different magnitude and character, permit rapid determination of effects which would occur in the actual system if subjected to a given load over a much longer period. Furthermore after observation and recording of the data pertinent to one test has been completed the system can be instantly restored to its original condition and made available for the succeeding determination. Thus, for example, if it is desired to study the temperature rise in a cable of given length under a predetermined electrical load applied for a specified period the analogous electrical element is set so as to react electrically to a smaller load in substantial accordance with the thermal responses of the cable to such load but at a greatly enhanced rate in point of time. Comparative results are measured in terms of electrical units rather than units of temperature which for purposes of the present invention are treated as mathematically interchangeable therewith under special rules, so that after the analogous element has been subjected to the appropriate load for a suitable time corresponding to but much less than the time of the imposition of the real load as given in the problem presented, the flow of current to the analogous element is automatically interrupted and a comparative indication of conditions existing at the moment of interruption produced with a high degree of accuracy, its translation from a voltage reading into a temperature factor reflecting the heating effect on the actual system of the real load for the postulated time.

The required data can be obtained by the use of circuits shown in the drawing comprising a multiple section resistance capacitance network in which the analogous electrical elements to which reference has been made are represented as a series of sections 1, 1', 1", etc., comprising respectively variable condensers 2, 2', 2", etc. and variable resistors 3, 3', 3", etc., each condenser being connected in series with a switch 4, 4', 4", etc., all adapted for actuation mechanically in conjunction with a main switch 5 for energizing the network simultaneously with closing of all these switches at once. Connected with leads 6, 6', 6", etc. between switches 4, 4', 4" . . . and the respective variable resistors 3, 3', 3" . . . , are a plurality of contact points 7, 7', 7" etc. of a selector switch 10 which permits connection of any of the sections 1, 1', 1" . . . with the comparative testing circuit hereafter more fully described.

Thus the series of sections may be deemed an analogous network in which each individual section may be adjusted to respond electrically to a current carried by leads 11, 12 in a manner exactly analogous to that in which a corresponding element or factor of the line or other apparatus being studied would respond thermally to a load of known magnitude in relation to that carried by leads 11, 12. Thus for example the section 1 might be adjusted to be analogous to the cable conductors, section 1' to be analogous to the insulation and cable sheath, section 1" to the pipe or duct in which the cable is extended and so on, each capacitor and its associated variable resistor being set to simulate electrically the essential thermal characteristics of the parts to which they respectively are analogous, fixed resistors 13, 13' etc., being arranged to be shunted across the condensers 2, 2' for discharging them by operation of switches 4, 4' etc. after a test has been completed. Lead 11 is arranged to feed current to the network from a source (not shown) through one pole 15 of a master control switch 16 via one terminal 17 of main switch 5 during a test, or directly through the other terminal 18 of switch 5 after a test has been completed when switch 5 is actuated to discharge the condensers. Desirably suitable controls (not shown) for the control system supplying current to leads 11, 12 are provided which permit delivering to the network constant current or current varying in magnitude to simulate a wide variety in load conditions.

The timing and testing circuit comprises a pair of leads 25, 26 respectively connected to suitable current sources and carrying respectively, for example, 175 volts, positive, and 250 volts, negative, relatively to the ground. Across leads 25, 26 there is connected a thyratron tube 27 in series with the solenoid coil 28 of a normally closed solenoid switch 29 and a resistor 30 whereby when the voltage of the grid 31 of the tube attains sufficient magnitude to cause the tube to conduct the switch is opened and remains open until one test is completed and the circuit is deenergized preparatory to making a subsequent test.

The grid 31 of tube 27 is connected to a circuit comprising a condenser 32 and a second pole 33 of switch 16 whereby when the switch is in one position the condenser is charged through a variable resistor 34 and in the other position discharged through a fixed resistor 36, the adjustment of resistor 34 of course being determinative of the time elapsing between closing of the condenser charging circuit and accumulation of sufficient potential at grid 31 to "fire" the thyratron tube 27.

Solenoid switch 29 to which reference has been made is connected in series with the selector switch 10 and a comparative condenser 40 in the main analog unit charging circuit whereby depending on the position of switch 10 condenser 40 is charged thereby and on firing of the tube 27, causing switch 29 to open, charging of the condenser is interrupted at a predetermined point in time determined by the setting of resistor 34.

At the opening of the solenoid switch the comparative condenser 40 carries a charge proportional to the charge in that section of the analog network to which it is connected through selector switch 10 and in accordance with the invention means are provided for obtaining a visual reading of the voltage on this condenser without drawing current from it, said means including a thermionic valve 50 comprising a cathode 51 connected through a variable resistor 52 to lead 26 between fixed resistors 53, 54 and an anode 55 connected through a variable resistor 56 directly to lead 25 and through a volt meter 57 to said lead between fixed resistors 58, 59 therein. Resistors 54 and 59 have a common connection with lead 12 to the ground 60 whereby through adjustment of resistor 52 an initial negative bias on grid 61 of valve 50 is produced while resistor 56 provides a zero balance adjustment for the voltmeter 57. The latter therefore after opening of switch 29 affords a reading of the voltage across the condenser 40 but does not draw appreciable current therefrom and the voltmeter indicator therefore remains substantially stationary for a sufficient time to permit the value of this voltage to be readily determined by observation.

The timing and testing circuit when connected as illustrated with a current to be introduced into the network supplied through an electronic current control system or other apparatus (not shown) to leads 11, 12 is placed in operation by actuation of master switch 16 connecting lead 11 through pole 15 with terminal 17 of the closed network switch 5 and simultaneously connecting lead 25 through adjustable resistor 34 to grid 31 of thyratron tube 27 and condenser 32. As the voltage across leads 11, 12 builds up voltages in condensers 2, 2' etc., it builds up in comparative condenser 40 a voltage exactly proportional to that being acquired by one of the first mentioned condensers, depending on the position of selector switch 10, this latter voltage being analogous to the temperature rise in the corresponding power system element under the given load conditions. When the bias of grid 31 reaches a predetermined value depending on the setting of resistor 34 and the tube 27 conducts, energizing solenoid coil 28 of timer switch 29 to open its circuit, further charging of the comparative condenser 40 is automatically interrupted with the condenser at a voltage comparable to that of the corresponding section condenser. The voltage of condenser 40 at this point of interruption being impressed upon the grid 61 of valve 50 current flows through the latter and produces on the voltmeter an indication affording a reading readily convertible to the network section condenser voltage at the moment of such interruption. The comparative condenser voltage decays only very slowly so a substantial period of time is available for observation of the meter and accurate determination of the condenser voltage, which when translated mathematically with the aid of suitable formulae affords an indication of the temperature condition that would develop in the system subject to conditions analogous to those impressed on leads 11, 12 after a predetermined time corresponding to the time between the actuation of master switch 16 and the automatic actuation of timer switch 29 in the simulated or analogous element.

Immediately after the voltmeter has been read the circuits may readily be conditioned for a subsequent test through actuation of switch 5 to discharge the adjustable network and switch 16 and a normally closed push button switch 62 to reset the timer and testing circuits. Thus either the same analogous representation or another one, for the same or a different period of time after the initiation of the operation may be obtained by suitable adjustments of condensers 2, 2' etc. and resistors 3, 3' etc. or of resistor 34 for obtaining a reading corresponding to a different period of time, selector switch 10 of course being moved from one of the several contacts 7, 7' etc. to another when conditions in another of the elements of the system are to be evaluated.

By repeating these operations for different periods a sufficient number of times in connection with each network section at a single setting of the network there may be accumulated readings showing electrical responses of the several sections and corresponding data relating to the elements of a known system and there may be thus accumulated full information as to the thermal responses of the system elements under varying loads and conditions. When sufficient values have been obtained and plotted, curves may be drawn which are often of assistance in determining the temperature conditions that would ensue, for example, from overloading a transmission line for a given period due to excessive local demand for power or the like.

It will of course be appreciated that while each reading of the voltmeter affords only a comparative value for the voltage of the condenser of one section in the network and normally a number of such values in respect to that condenser are requisite for plotting a curve, the voltage accumulated in any section during a test is a function not only of the voltage applied to the network and the adjustment of the condenser and resistor in that section but of the corresponding adjustments of the other sections as well, in the same manner that the temperature transient under a given load of any element such as a conductor of a transmission line is affected by the temperature transients and the other factors in other elements of the line.

Reference has been made to the use of analogous elements and it will be understood the information required in order to enable the various network sections to be adjusted so as to correspond to the actual elements of the system may be obtained by experimentation or calculated according to known procedures but the method of or means for producing a circuit in which accelerated electrical results are analogous to thermal effects of current flow forms no part of the invention which is usually employed for testing briefly and in a rather general way the conditions which would be produced in the analogous system; it may also be used, however, for more detailed work particularly if a recording voltmeter or the like be substituted for voltmeter 57. Moreover, I have indicated only diagrammatically the electrical cicuits employed in my apparatus without illustration of the latter as the precise physical form of any of its elements is of negligible importance, it being only necessary that switches, resistors, condensers, tubes and the like of suitable values and electrical properties be supplied and connected together substantially in the manner shown.

I have also made reference to an electronic current control system which may facilitate control in accordance with a predetermined plan of the current flowing in on leads 11, 12 during a test but this control can be effected by any other suitable means having the desired capabilities and mention of said system is therefore merely to suggest apparatus of suitable nature for use in connection with that embodying the invention.

It will be appreciated that with the aid of my apparatus readings may be obtained in a few seconds which reveal transient temperature conditions which could only be actually produced in hours in the system being simulated, and if so produced might result in damage to the system requiring expensive repairs and interruptions in service, whereas even if a unit of my apparatus should break down during a test, its replacement would involve only relatively insignificant cost.

Thus while I have described one embodiment of the invention with considerable particularity I do not desire or intend thereby to limit or confine myself thereto in any way as changes and modifications in the elements themselves and the mode of their interconnection will readily occur to those skilled in the art and may be made if desired without departing from the spirit and scope of the invention as defined in the appended claims.

Having thus described my invention, I claim and desire to protect by Letters Patent of the United States:

1. In an analog computor for determining temperature transients by electric analogy, a multiple section resistance-capacitance network, a switch operable to open and close a circuit including the network, resistors respectively adapted for connection across the capacitances of the network sections when the switch is actuated in a direction to open said circuit, means selectively interconnectable in said circuit with any one of said sections and effectively in parallel with the capacitance of such section including a condenser adapted to receive a voltage proportional to the voltage on said capacitance, timing means for interrupting the circuit through said last mentioned condenser upon elapse of a predetermined time interval after the initiation of said network circuit, said timing means including a thyratron tube and a solenoid switch having its solenoid connected with the tube and normally closed contacts in series with the condenser operable when the solenoid is energized through the tube to interrupt the condenser circuit, and electronic means affording visual indication of the voltage of said condenser upon interruption of the condenser circuit without drawing appreciable current from the condenser.

2. In an analog computor for determining temperature transients by electric analogy, a multiple section resistance-capacitance network, means selectively interconnectable in circuit with any one of said sections and effectively in parallel with the capacitance of such section including a condenser adapted to receive a voltage proportional to the voltage on said capacitance, timing means for interrupting the circuit through said last mentioned condenser upon elapse of a predetermined time interval after the initiation of the network circuit, said timing means including a thyratron tube and a solenoid switch having its solenoid connected with the tube and normally closed contacts in series with the condenser operable when the solenoid is energized through the tube to interrupt the condenser circuit, and electronic means affording visual indication of the voltage of said condenser upon interruption of the condenser circuit without drawing appreciable current from the condenser.

3. In an analog computor for determining temperature transients by electric analogy, a multiple section resistance-capacitance network, a circuit including said network, means selectively inetrconnectable in said circuit with any one of said sections and effectively in parallel with the capacitance of such section including a condenser adapted to receive a voltage proportional to the voltage of said capacitance, an electronic voltmeter, means for impressing on said voltmeter the voltage acquired by said condenser, means for disconnecting the condenser and voltmeter from the section and timing means for actuating said disconnecting means.

References Cited in the file of this patent

UNITED STATES PATENTS

| | | |
|---|---|---|
| 2,327,791 | Hopper | Aug. 24, 1943 |
| 2,470,434 | Eckman et al. | May 17, 1949 |
| 2,519,615 | Wannamaker | Aug. 22, 1950 |
| 2,540,310 | Wolf | Feb. 6, 1951 |

FOREIGN PATENTS

| | | |
|---|---|---|
| 252,807 | Switzerland | Oct. 16, 1946 |

OTHER REFERENCES

Heat Transfer Problems Solved with Roomful of R-C Networks; 'Electronics'; April 1943; pages 181–183.

The Electro-Analogue, An Apparatus for Studying Regulating Systems; M. L. Lanssen and L. Ensing; "Philips Technical Review"; March 1951; pages 257–271; volume 12, No. 9.